Figure 1:
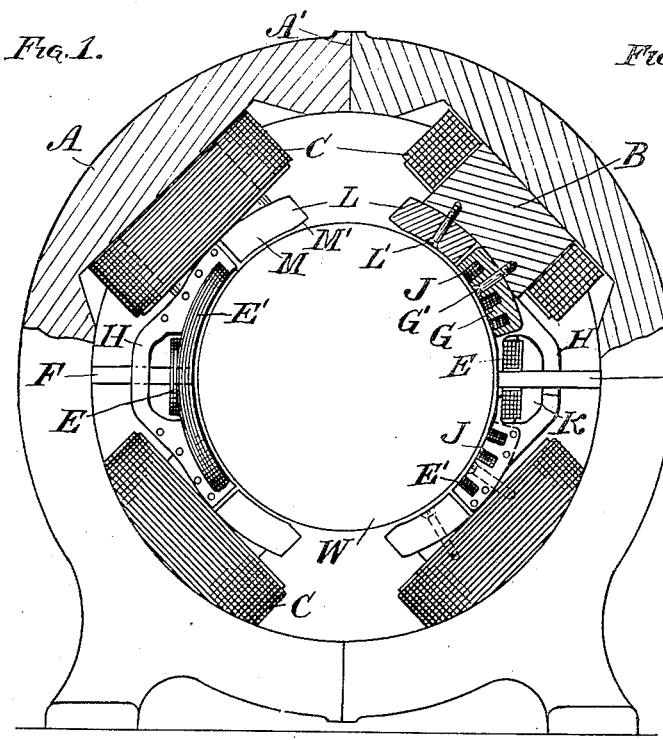

L. TORDA.
COMPENSATED DYNAMO ELECTRIC MACHINE.
APPLICATION FILED FEB. 29, 1908.

1,053,680.

Patented Feb. 18, 1913.

Witnesses:
F. E. Gaither.

Inventor,
Ludwig Torda

L. TORDA.
COMPENSATED DYNAMO ELECTRIC MACHINE.
APPLICATION FILED FEB. 29, 1908.
1,053,680.
Patented Feb. 18, 1913.
2 SHEETS—SHEET 2.
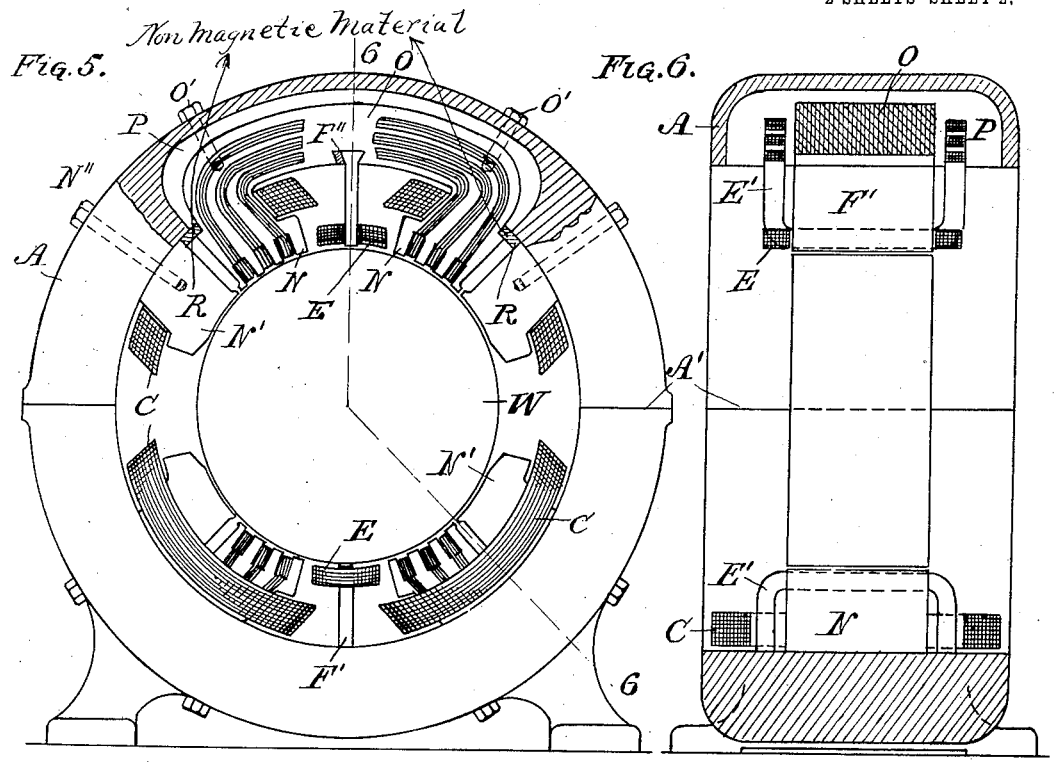
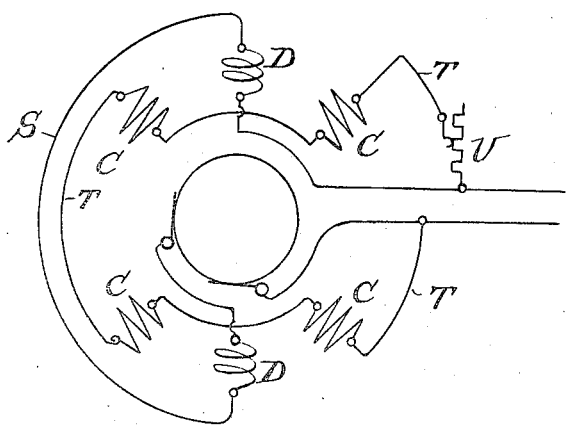
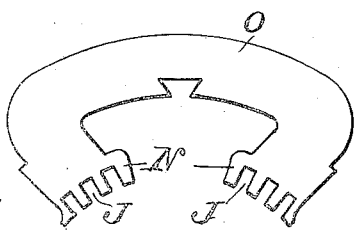
Witnesses:
F. E. Gaither.
Inventor,
Ludwig Torda

UNITED STATES PATENT OFFICE.

LUDWIG TORDA, OF WILKINSBURG, PENNSYLVANIA.

COMPENSATED DYNAMO-ELECTRIC MACHINE.

1,053,680.  Specification of Letters Patent.  Patented Feb. 18, 1913.

Application filed February 29, 1908. Serial No. 418,533.

*To all whom it may concern:*

Be it known that I, LUDWIG TORDA, a resident of Wilkinsburg, in the county of Allegheny and State of Pennsylvania, have invented certain new and useful Improvements in Compensated Dynamo-Electric Machines, of which the following is a specification.

This invention relates to dynamo electric machines with commutators for direct and alternating current, and has particular reference to so-called compensated machines.

Compensated machines hitherto constructed are characterized by the fact that along the whole inner periphery of the stationary part of such a machine grooves or slots parallel to the armature slots are provided. Embedded in these slots are coils forming a winding, which is called "compensating winding" because its magneto-motive-force is compensating the armature magneto-motive-force. The compensating winding is uniformly distributed and is so arranged that compensating coils are embracing each space which separates two adjacent main poles. The main disadvantage of such a compensated machine is that it is too expensive for most practical purposes, the amount of copper required for the compensating winding being 50 to 100% in excess of the amount required for the armature winding. The loss of energy in the compensating winding is correspondingly large and thereby the efficiency of the machine is impaired. Another economical disadvantage of the compensated machines, heretofore built is that, owing to the fact that the whole inner periphery of the magnet frame or the whole of the pole faces are occupied by the compensating winding, its construction is not sufficiently simple.

The object of this invention is to reduce the cost, increase the efficiency and simplify the construction of compensated machines. This purpose is attained by so arranging a compensating winding that it covers only a portion of the inner periphery of the stationary part, with its coils embracing only alternate main pole-separating spaces, and by suitably shaping the main pole faces.

With machines subject to this invention a considerable saving is effected both in copper and in energy, and owing to the compensating winding embracing only alternate field-magnet separating spaces, the stationary part can be built in independent sections, and may be disassembled without first taking out the armature, or removing any of the compensating coils.

The principle underlying this improved construction is, that the field distortion is reduced or eliminated without compensating the whole armature magneto-motive-force. Accordingly, machines embodying this principle may briefly be called "semi-compensated" machines. In semi-compensated machines the airgap between the armature and magnet frame can be reduced to the mechanically admissible minimum, thereby diminishing the main field ampere turns and proportionately diminishing the amount of main-field copper required, and reducing the loss of energy to a minimum. This result had heretofore not been attained in other than fully compensated machines.

In a semi-compensated machine wherein a commutating field is required to obtain good commutation, I prefer to provide the device known as a commutating pole, placed in each main-pole-separating space bridged by a compensating coil. In some cases commutating poles may be placed in each space between adjacent main poles, those commutating poles not embraced by the compensating windings each having its own energizing coil.

The invention may be variously embodied in both direct and alternating current machines, three adaptations thereof to direct current machines being shown in the accompanying drawings, wherein—

Figure 2:
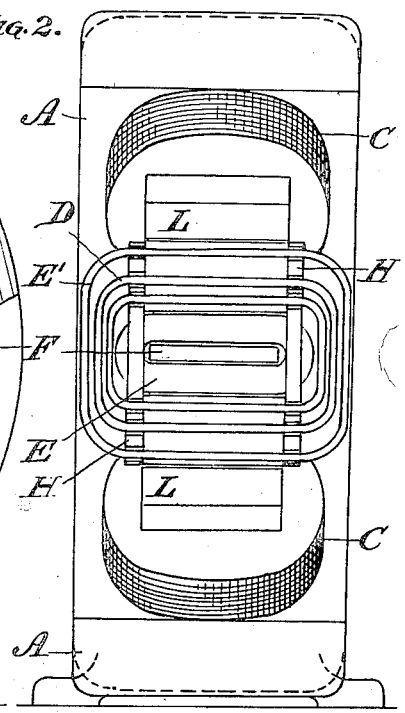
Figure 3:
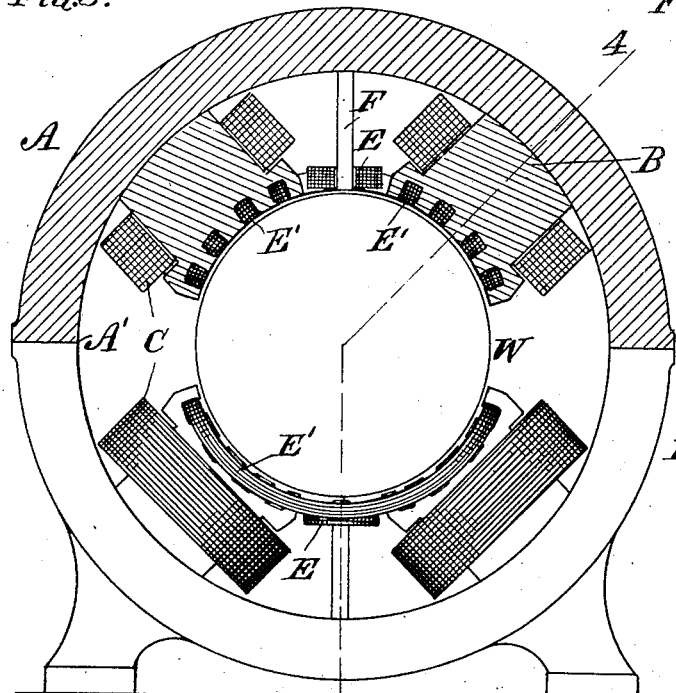
Figure 4:
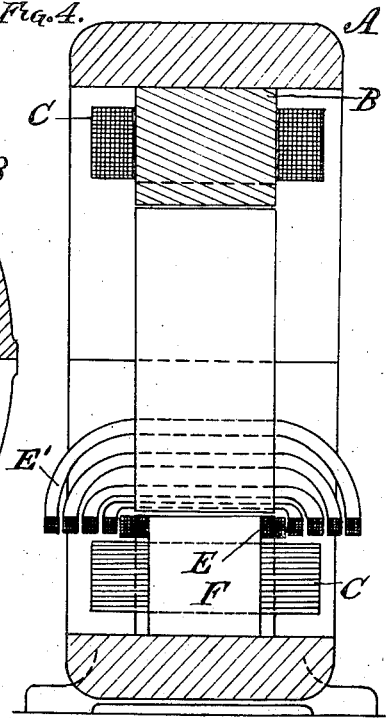

Figure 1 is a view partly in elevation and partly in section of a desirable embodiment of the invention, and Fig. 2 is an inner edge view of one of the main frame sections and the parts carried thereby. Figs. 3 and 5 are views similar to Fig. 1 of other adaptations of the invention, and Figs. 4 and 6 are vertical cross sections taken, respectively, on lines 4—4 and 6—6 of Figs. 3 and 5. Fig. 6ª is a detail, showing the form and construction of the part illustrated in Figs. 5 and 6 which carries the compensating winding. Fig. 7 is a diagram of the connections of the windings.

Referring to Figs. 1 and 2 of the drawings, the stationary magnet frame A supports the magnets B, C being the coils therefor. Bridging each alternate field-pole-separating space is compensating winding D, having a central portion E embracing the commutating pole F, projecting from frame A midway between magnets B, the outer portion E' of the winding extending to a portion only of each pole face of the adjacent magnets B, the face portions thus reached by the winding being slotted at J to receive the same. The slotted portion G of the pole faces that receive the winding are in the form of detachable members, with screws G' securing them to the magnets. Adjacent members G are united by the connecting brackets H of non-magnetic material, extending from one to the other at opposite sides of commutating pole F. Laterally open cavities or recesses K in brackets H receive and support the central portions E of the compensating winding, and the outer portion E' extends through the slots J in face member G as shown. The plain portion L of each pole face may also be detachable and secured to the body of the magnet by screw L'. Attention is directed to the shape of the face of this unslotted portion. At the side thereof next to the slotted face G, the clearance or airgap between it and the rotating part W of the machine is substantially the same as at the slotted portion, all as indicated at M. Beyond this and to the outer end or side of member L, the face diverges from the rotating member, as shown at M'. This increase in the airgap causes the reluctance of the magnetic path to be substantially the same at the non-slotted portion of the pole face as at the slotted portion, thus preventing an unequal distribution of the main field along the pole face. Also, this increase in the airgap reduces further the field distortion. One of the structural advantages of this arrangement is that the slotted pole faces and the auxiliary winding may be adjusted with reference to each other and secured to brackets H before being positioned in frame A, the brackets forming convenient means for handling the parts thus assembled and for placing them in position within the frame. While in Figs. 1 and 2, only a half of each pole-face is slotted, the invention is not thus restricted.

In the embodiment of Figs. 3 and 4, the magnets are each formed in one piece. The pole-faces are grooved as shown to receive the outer portion E' of the compensating winding E, with commutating pole F extending therethrough. In this instance the compensating coils are shown distributed along the whole pole-face of each magnet.

In the construction shown in Figs. 5 and 6, half of each main pole-face is slotted and the other half plain. The slotted portions N of adjacent or successive magnets are formed of a body of laminated metal O, of loop or horse-shoe form, which extends within a cavity P in frame A and secured by screws O'. Face portions N are slotted to receive the outer coils E' of the compensating winding E, the latter embracing the commutating pole F' which has a dove-tail and key connection F'' with member O. The non-slotted portions N' of the magnets are detachable, being secured by screw N'', portions N and N' being embraced by the main field coils C, as shown. In assembling the parts, the integral pole portions N may be projected through the main field coils, the commutating pole F placed in position and the compensating winding inserted, all before said parts are fixed within frame A. The parts thus assembled may then be lifted into position and the removable non-slotted pole portions N' passed inwardly through the main field coils C, and all parts made secure by inserting screws N'' and O'. The slotted and unslotted portions of each pole are separated by a non-magnetic bar R, thus magnetically insulating member O from the outer parts of the machine and reducing the distortion of the main field. In this embodiment of the invention, as in that shown in Figs. 1 and 2, the slotted and non-slotted portions of the pole face are so arranged with reference to the airgap as to maintain uniform or equalized magnetic resistance.

By referring to Fig. 8 it will be seen that the compensating windings are connected in series with the armature winding, the compensating coils D being in the main circuit S, and the magnet coils C in the shunt circuit T, with the usual field rheostat U in the shunt circuit.

It is characteristic of the several embodiments of the invention that the main magnet frame A is formed in sections which part at A' in a line extending between field magnets unconnected by compensating winding, so that the frame may be taken apart without disturbing any of the windings.

In the drawings, machines with four main poles are shown, but it is obvious that the invention applies to machines with any number of main poles.

While the drawings are executed with particular reference to direct current machines, for alternating current machines the essential part of the construction remains the same, remembering at the same time that the magnet frame must consist of laminated iron.

I claim:—

1. A dynamo electric machine with interpolar air spaces, compensating windings bridging only some of the field pole separating spaces and having a number of ampere turns less than the ampere turns of the armature, the windings extending into only those portions of the pole-faces which are adjacent to the bridged spaces.

2. A dynamo electric machine having only a portion of each field magnet face slotted with the slotted portions of successive magnets adjacent each other and the unslotted portions adjacent each other, and a compensating winding in each alternate magnet-separating space with part of the winding within said slots.

3. A dynamo electric machine having a compensating winding bridging each alternate field-magnet-separating space, a portion of each winding extending over a part only of the face of each of said adjacent magnets and a portion of the winding located between the magnets.

4. A dynamo electric machine having a compensating winding extending over only a portion of each field-magnet face, the other portion of the magnet face being so spaced from the rotating part of the machine that the reluctance of the air-gap is the same on each portion of the face.

5. A dynamo electric machine having a compensating winding bridging alternate field-magnet-separating spaces, each winding extending over only those portions of the magnet faces adjacent the bridged space with the winding applied portion and the other portion of each magnet face so spaced from the rotating part of the machine as to make the reluctance of the air-gap the same on each portion.

6. A dynamo electric machine having a compensating winding extending over only a portion of each field magnet face, such face portion being slotted to receive the winding, a portion of the unslotted part of the face adjacent the slotted part being spaced uniformly from the rotating part of the machine and the remainder of the unslotted portion diverging from the rotating part, whereby the reluctance of the air-gap on the unslotted portion of the magnet face is the same as on the slotted portion.

7. In a dynamo electric machine, adjacent field magnets each having a detachable face member, a commutating pole positioned between the magnets, brackets at opposite sides of said pole connecting the said face members, and a compensating winding supported by the brackets with a portion of the winding extending into said face members.

8. A dynamo electric machine having only a portion of each field magnet face slotted with the slotted portions of successive magnets adjacent each other and the unslotted portions adjacent each other, and compensating windings bridging those spaces separating the slotted portions of the faces with the windings extending into said slots.

9. In a dynamo electric machine, a field magnet having a portion of its face recessed and the remainder of the face so spaced from the rotating part of the machine that the reluctance of the air-gap is the same on both the recessed and unrecessed portions of the face, and compensating winding within the face recess.

10. In a dynamo electric machine, adjacent field magnets each having a detachable face member, supporting members extending across the magnet-separating space with the face members secured therebetween, and a compensating winding extending to the face members.

11. In a dynamo electric machine, adjacent field magnets each having a detachable and slotted face member, supporting members extending across the magnet-separating space with the face members secured therebetween, the supporting members being slotted like the face members, and a compensating winding within the slots of the face and supporting members.

12. In a dynamo electric machine, adjacent field magnets each having a detachable face member, handle-forming brackets extending across the magnet-separating space with the face members secured between the brackets, and a compensating winding extending to the face members.

In testimony whereof I affix my signature in presence of two witnesses.

LUDWIG TORDA.

Witnesses:
J. M. NESBIT,
ALBERTA RICHARD.